United States Patent
Kinoshita

(10) Patent No.: US 6,994,353 B2
(45) Date of Patent: Feb. 7, 2006

(54) METAL GASKET

(75) Inventor: Yuuichi Kinoshita, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/950,572

(22) Filed: Sep. 28, 2004

(65) Prior Publication Data

US 2005/0077687 A1    Apr. 14, 2005

(30) Foreign Application Priority Data

Oct. 8, 2003    (JP)    ............... 2003-349326

(51) Int. Cl.
*F02F 11/00*    (2006.01)
(52) U.S. Cl. ............ 277/592; 277/593; 277/595
(58) Field of Classification Search ............... 277/592, 277/593, 595, 600, 594
See application file for complete search history.

(56) References Cited

U.S. PATENT DOCUMENTS

| | | | |
|---|---|---|---|
| 1,030,055 A * | 6/1912 | Darlington | 277/612 |
| 4,387,904 A * | 6/1983 | Nicholson | 277/595 |
| 4,397,472 A * | 8/1983 | Czernik | 277/592 |
| 4,721,315 A * | 1/1988 | Ueta | 277/593 |
| 5,522,604 A * | 6/1996 | Weiss et al. | 277/594 |
| 5,544,899 A * | 8/1996 | Ueta | 277/595 |
| 5,639,101 A * | 6/1997 | Tanaka et al. | 277/593 |
| 5,785,322 A * | 7/1998 | Suggs et al. | 277/615 |
| 6,027,124 A * | 2/2000 | Ishida et al. | 277/595 |
| 6,554,286 B1 * | 4/2003 | Tanaka | 277/591 |
| 6,786,490 B2 * | 9/2004 | Fujino et al. | 277/590 |
| 2004/0041352 A1 * | 3/2004 | Hohe et al. | 277/593 |

FOREIGN PATENT DOCUMENTS

| | | | |
|---|---|---|---|
| EP | 1065417 | * | 1/2001 |
| JP | 2001-295941 | * | 10/2001 |
| WO | WO 01/96768 A1 | | 12/2001 |

* cited by examiner

*Primary Examiner*—Alison K. Pickard
(74) *Attorney, Agent, or Firm*—Manabu Kanesaka

(57) ABSTRACT

A gasket is interposed at a joining portion between two members. The gasket includes a gasket base plate having an opening through which fluid flows and a plurality of annular beads formed in a wave shape over a predetermined area extending outwardly from a hole edge of the opening; and at least one shim covering only the annular beads. The shims are laser-welded at a welding portion to cover the beads. Thus, the metal gasket does not have a pressure trace on abutting surfaces of a cylinder head.

9 Claims, 4 Drawing Sheets

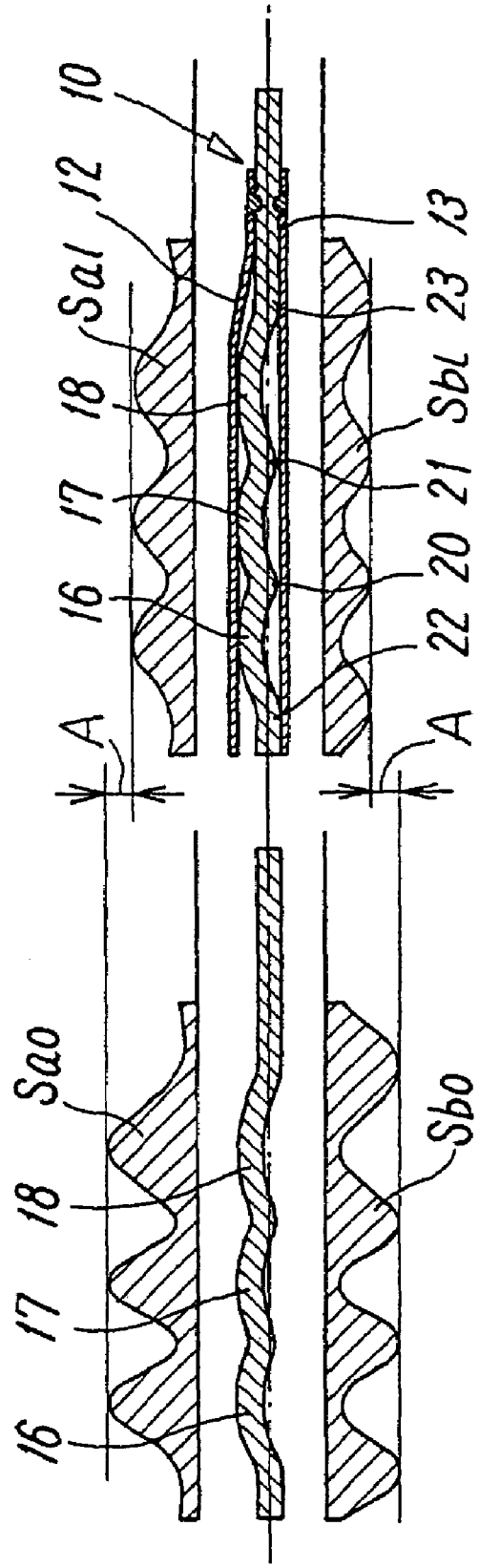

METAL GASKET

BACKGROUND OF THE INVENTION AND RELATED ART STATEMENT

The invention relates to a metal gasket to be disposed between, for example, a cylinder block and a cylinder head of an internal combustion engine.

In a metal gasket 100 disclosed in Japanese Patent Publication (KOKAI) No. 11-230355, as shown in FIG. 7, a gasket base plate 101 is provided with a plurality of annular beads 102 and 103 around a cylinder bore. When a cylinder head 104 and a cylinder block 105 are tightened, high surface pressures are generated at abutting portions between the cylinder head 104 and the annular bead 102 and between the cylinder block 105 and the annular beads 103 to improve the sealing ability thereat.

However, in the metal gasket 100, a high surface pressure is generated at the abutting portion where the annular bead 102 or 103 abuts against the cylinder head 104 or the cylinder block 105, and forms a pressure trace at the abutting surface. When the tightening of the cylinder head 104 and the cylinder block 105 is released for repair or inspection and the cylinder head 104 and the cylinder block 105 are tightened again with a new gasket 100 therebetween, the pressure trace does not necessarily match the annular bead 102 of the new metal gasket 100. Therefore, there has been a problem that the sealing ability at the tightening portion is lowered.

In view of the above problems, the present invention has been made, and an object of the invention is to provide a metal gasket wherein a plurality of annular beads increases surface pressures at abutting portions, and a pressure trace is not formed on an abutting surface of the cylinder head.

Further objects and advantages of the invention will be apparent from the following description of the invention.

SUMMARY OF THE INVENTION

In order to solve the above problems, the present invention is to provide a metal gasket to be disposed between two connecting members where fluid flows therein to prevent the fluid from leaking outside. The metal gasket includes a gasket base plate having an opening through which the fluid passes and a plurality of annular beads formed in a wave shape over a predetermined area extending outwardly from a hole edge of the opening; and a shim for covering the annular bead portion to abut against at least one surface of the gasket base plate so that the gasket base plate and the shim are connected.

As a preferable embodiment of the metal gasket according to the present invention, the shims are provided on both sides of the gasket base plate. Also, the shims extend from the opening of the gasket base plate to the vicinity of an outer side of the bead located at the outermost position to cover the beads. It is preferable that the shims are fixed to the gasket base plate by a laser welding.

A preferable embodiment of the metal gasket according to the present invention is structured such that a relationship between a thickness $t_1$ of the gasket base plate and a thickness $t_2$ of the shim is $t_1 > t_2$, and a relationship between a hardness $h_1$ of the gasket base plate and a hardness $h_2$ of the shim is $h_1 < h_2$.

According to the metal gasket of the present invention having the structure described above, in the metal gasket wherein surface pressures at the abutting portions of a plurality of annular beads are increased, the surface pressures acting on the cylinder head or the cylinder block become uniform, so that a pressure trace is prevented from being formed on the cylinder head or the cylinder block. Also, the gasket base plate around the cylinder bore has a large thickness due to the shims to thereby improve the sealing ability.

According to the metal gasket of the present invention described above, while the surface pressures at the abutting portions of the annular beads are increased, the formation of the pressure trace on the abutting surface of the cylinder head can be prevented.

BRIEF DESCRIPTION OF THE DRAWINGS

FIG. 4(A) is a conventional metal gasket for explaining a surface pressure generating condition, and FIG. 4(B) is a metal gasket of the first embodiment, respectively;

DETAILED DESCRIPTION OF PREFERRED EMBODIMENTS

Figure 1:
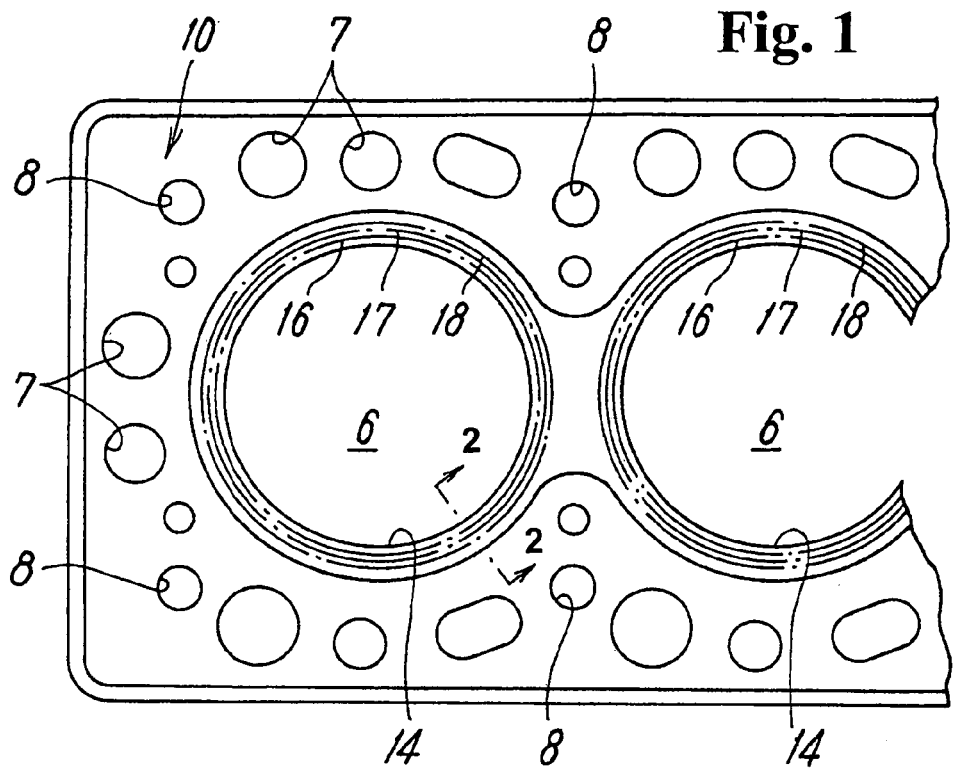
FIG. 1 is a plan view showing a metal gasket according to a first embodiment of the invention.

The present invention will be explained in detail based on embodiments shown in the accompanying drawings. In the respective embodiments shown in the drawings, a metal gasket of the invention is applied to a contact portion of a cylinder block and a cylinder head of an engine.

Figure 2:
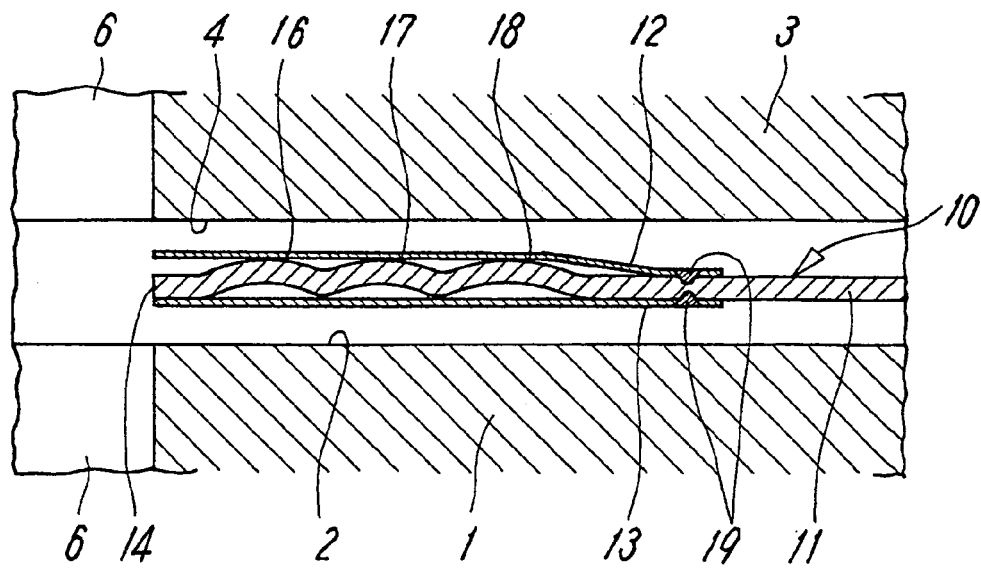
FIG. 2 is an explanatory schematic sectional view of the metal gasket corresponding to a section taken along line 2—2 in FIG. 1.

FIGS. 1 and 2 show a first embodiment of a metal gasket 10 to be attached to a cylinder head attaching surface 2 of a cylinder block 1. The metal gasket 10 is attached to a contact portion between the cylinder block 1 and a cylinder head 3 to prevent combustion gas in a cylinder bore 6 provided therein and engine cooling water or oil circulating therein from leaking outside. The metal gasket 10 is formed of, as clearly shown in FIG. 2, a gasket base plate 11, and first and second shims 12 and 13 disposed on upper and lower surfaces of the gasket base plate 11, respectively. Also, the metal gasket 10 includes openings (combustion chamber holes) 14 substantially corresponding to the cylinder bores 6 formed in the cylinder block, and also, fluid holes 7 of cooling water and oil and holes 8 for tightening bolts, as apparent from a flat surface shape shown in FIG. 1.

The gasket base plate 11 is formed of a metal plate with a thickness $t_1$ in the order of, for example, 0.2 to 0.3 mm, and includes multiple annular beads 16, 17 and 18 in a wave shape in a predetermined area extending outwardly from a hole edge of the opening 14. The first shim 12 and second shim 13 are provided on upper and lower surfaces of the gasket base plate 11 for covering portions of the multiple annular beads 16, 17 and 18. The shims 12 and 13 may have a structure wherein the respective shims surround each of the cylinder bores 6 and are integrally connected, as shown in the drawing; or a structure wherein the shims surrounding each of the cylinder bores 6 are independently formed in a ring shape. The shims 12 and 13 are formed of a metal plate having a thickness $t_2$ in the order of, for example, 30 to 100 μm, smaller than the thickness $t_1$ of the gasket base plate 11, and having a hardness $h_2$ greater than the hardness $h_1$ of the gasket base plate 11. Incidentally, the thickness $t_1$ of the gasket base plate 11 and the thickness $t_2$ of the shims 12 and 13 are not limited to the above-stated ranges.

The gasket base plate 11 and the first and second shims 12 and 13 are laser-welded at welding portions 19 on the upper and lower surfaces so as to surround the periphery of the annular bead 18 disposed at the outermost position from the opening 14 at an outer side end or in the vicinity thereof. Incidentally, including any embodiments described below, in a case that the shims surrounding the respective peripheries of the cylinder bores 6 are integrated as shown in FIG. 1, it is desirable that the shims are laser-welded to the gasket base plate for connecting the entire periphery surrounding the plural cylinder bores. However, a portion of the entire periphery may not be welded. Also, in a case that the shims are in a ring shape for surrounding each cylinder bore 6 individually, the whole periphery of each cylinder bore may be separately welded, or may be partially welded. Further, the welding may be replaced with other connecting methods.

Figure 3:
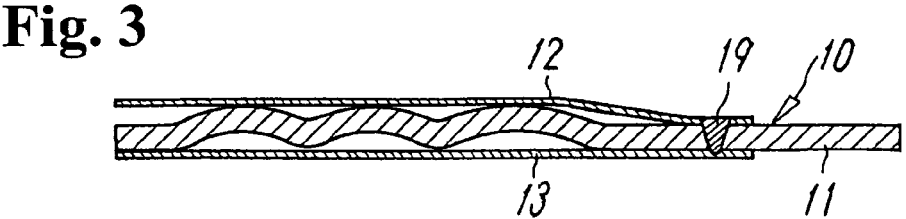
FIG. 3 is a sectional view corresponding to FIG. 2 showing a modified example of the first embodiment.

FIG. 3 shows a modified example of a welding portion 19 in the first embodiment, wherein the shims on the upper surface and the lower surface may be laser-welded from only one surface of the gasket base plate 11.

Next, an effect of the case in which the cylinder block 1 and the cylinder head 3 are tightened with the metal gasket 10 according to the first embodiment will be explained. FIGS. 4(A) and 4(B) are drawings for explaining a difference in operations and effects between the metal gasket 10 having the first and second shims 12 and 13 and a conventional metal gasket without these shims. In the metal gasket 10 of the first embodiment, as shown in FIG. 4(B), the annular beads 16, 17 and 18 (surface pressures Sa1); portions 20 and 21 projecting downwardly relatively and formed by the annular beads 16, 17, and 18; and angle portions 22, 23 at both ends of the beads contact the cylinder head and the cylinder block through the shims 12 and 13, 50 that surface pressures become uniform as compared with a case shown in FIG. 4(A) wherein surface pressures are directly applied to the cylinder head and the cylinder block from the annular beads 16, 17, and 18 and the like.

In other words, when the surface pressures Sa1 and Sb1 in the first embodiment shown in FIG. 4(B) are compared with the surface pressures Sa0 and Sb0 in the conventional metal gasket shown in FIG. 4(A) at portions corresponding to the above respective portions, although respective integration values do not change, the surface pressures Sa1 and Sb1 are generally lowered by A and become flat. Thus, an extreme high surface pressure is eliminated, thereby preventing a pressure trace from being formed by the metal gasket 10 on the attaching surfaces 2 and 4 (refer to FIG. 2) of the cylinder block and the cylinder head. Also, since the gasket base plate 11 is made thick due to the shims 12 and 13 around the cylinder bore, the sealing ability in the portion can be increased.

Figure 5A:
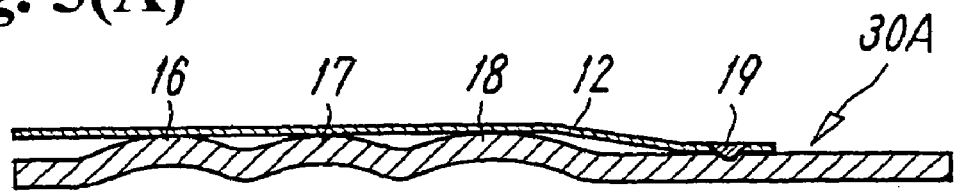
FIGS. 5(A) and 5(B) are partial sectional views of the metal gasket at the same position as that shown in FIG. 2 according to a second embodiment.
Figure 5B:
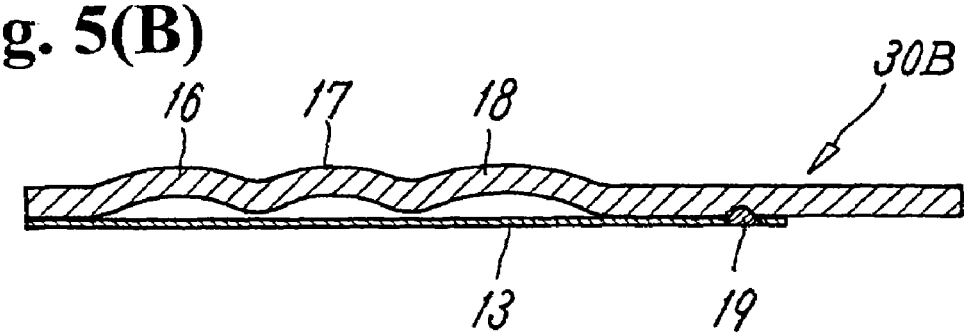

FIGS. 5(A) and 5(B) show metal gaskets 30A and 30B according to the second embodiment of the present invention. Incidentally, in the second embodiment, only structures different from that of the first embodiment are explained, and other explanations are omitted. The metal gasket 30A shown in FIG. 5 (A) is structured such that the first shim 12 covers a portion of the upper surface of the gasket base plate 11 having the annular beads 16, 17 and 18, and only the first shim 12 is laser-welded at the welding portion 19. Also, the metal gasket 30B shown in FIG. 5(B) is structured such that the second shim 13 covers a portion of the lower surface of the gasket base plate 11 same as that mentioned above, and only the second shim 13 is laser-welded at the welding portion 19.

In the metal gaskets 30A and 30B, the shim 12 or 13 is welded only on a side where there is a risk of generating a pressure trace, or a side where a pressure trace is desired not to take place. For example, in an engine where the cylinder block 1 and the cylinder head 3 are formed of different materials, the shim 12 or 13 is welded to one having a lower hardness than the other. Thus, the cost can be reduced.

Figure 6A:
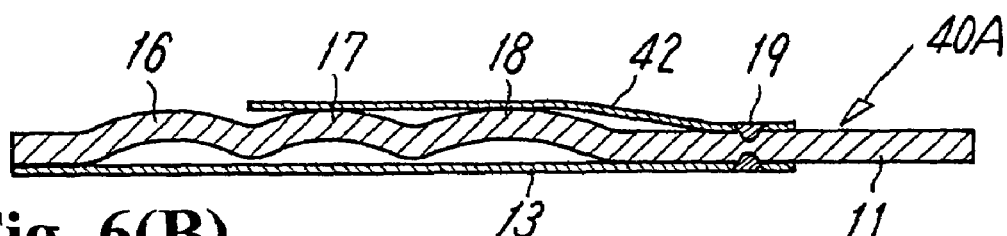
FIGS. 6(A) to 6(C) are partial sectional views of the metal gasket at the same position as that shown in FIG. 2 according to a third embodiment.
Figure 6B:
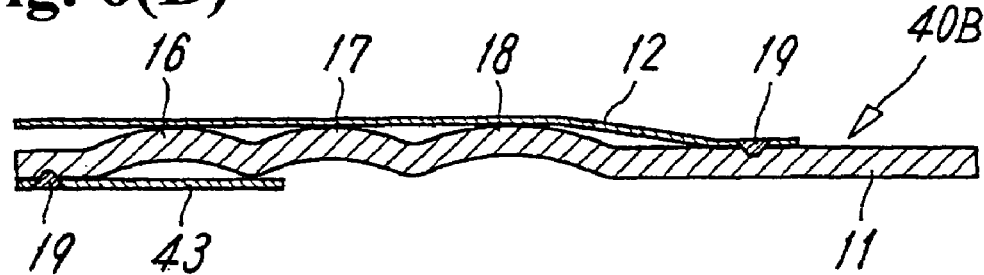
Figure 6C:
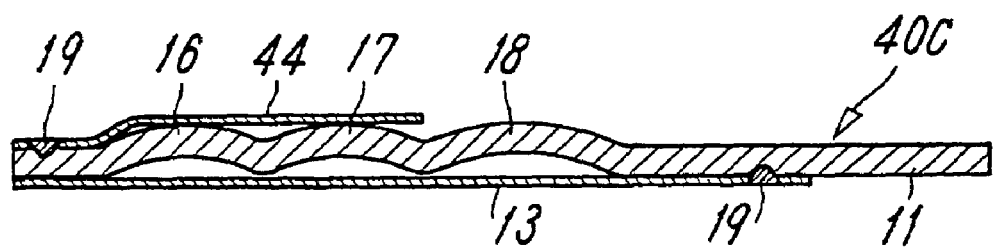
Figure 7:
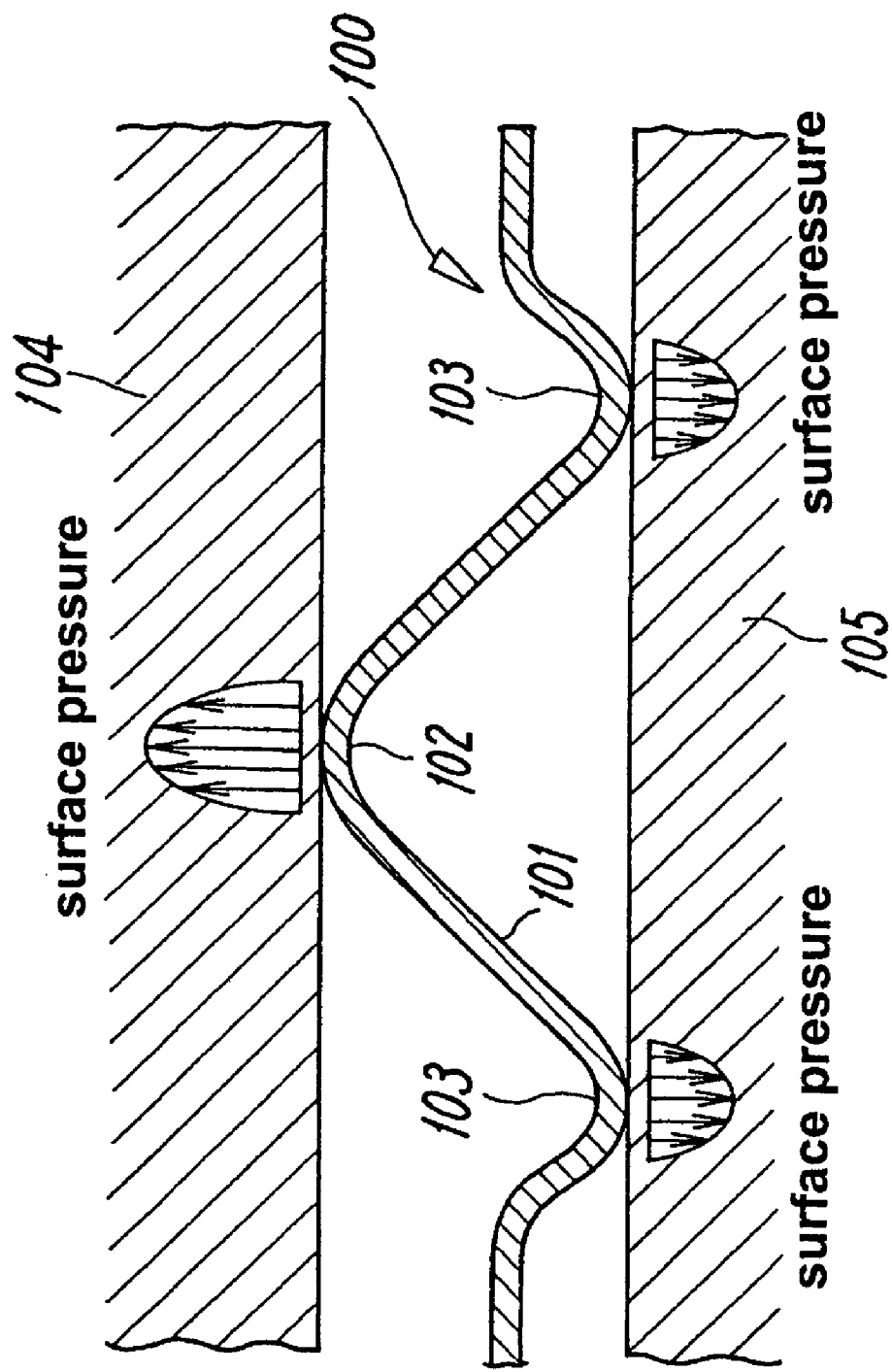
FIG. 7 is a partial sectional view of the conventional metal gasket at the same position as that shown in FIG. 2.

FIGS. 6(A) to 6(C) show metal gaskets 40A, 40B, and 40C according to the third embodiment of the present invention. In the third embodiment, only differences from those in the first embodiment are explained, and explanations of the other portions are omitted. The metal gasket 40A shown in FIG. 6(A) is structured such that the second shim 13 is laser-welded on the lower surface of the gasket base plate 11, and a third shim 42 covering the annular beads 17 and 18 is laser-welded to the upper surface. The metal gasket 40B shown in FIG. 6(B) is structured such that the first shim 12 is laser-welded on the upper surface of the gasket base plate 11, and a fourth shim 43 covering the lower surface portion corresponding only to the annular bead 16 is laser-welded in the vicinity of a hole edge of the opening 14. Further, the metal gasket 40C shown in FIG. 6(C) is structured such that the second shim 13 is laser-welded on the lower surface of the gasket base plate 11, and a fifth shim 44 covering the upper surface portion corresponding to the annular beads 16 and 17 is laser-welded in the vicinity of the hole edge of the opening 14.

In these metal gaskets, the shim 12 and 13 are welded only on portions where there is a risk of generating a pressure trace, or where the pressure trace is desired not to take place and, at the same time, the shim 42, 43 or 44 is selectively welded to a specific portion where there is a risk of generating the pressure trace, or where the pressure trace is desired not to take place. Thus, the surface pressure can be controlled at the required portions. Also, the necessary surface pressure can be obtained by the shims 42 and 43 or 44, and each shim functions as a stopper for stopping a movement of the metal gasket 40A, 40B, or 40C. The metal gaskets 40A, 40B, and 40C according to the third embodiment are effective not only for an automobile but also for other various applications.

The metal gaskets according to the present invention are not limited to the above-described embodiments, and they can be modified within the scope of claims. For example, in any metal gaskets according to the above-described embodiments, a coating material can be applied on the outer surface side of the gasket base plate or the shim. Further, while the above embodiments direct to the metal gaskets used for an engine, the metal gaskets according to the present invention can be used for tightening portions in other applications.

The disclosure of Japanese Patent Application No. 2003-349326, filed on Oct. 8, 2003, is incorporated in the application.

While the invention has been explained with reference to the specific embodiments of the invention, the explanation is illustrative and the invention is limited only by the appended claims.

What is claimed is:

1. A metal gasket to be disposed between two members, comprising:
    a gasket base plate for constituting the metal gasket having two surfaces, an opening for allowing fluid to pass therethrough, and a plurality of annular beads formed successively around the opening, and
    first and second flat shims placed on the two surfaces of the gasket base plate for entirely covering outer surfaces of the annular beads without extending an entire area of the gasket base plate, each of said first and second flat shims having an outer peripheral portion extending outwardly beyond the annular beads and being fixed to the base plate at the outer peripheral portion by laser welding.

2. A metal gasket as claimed in claim 1, wherein said gasket base plate has a thickness greater than that of the first and second shims.

3. A metal gasket as claimed in claim 1, wherein said gasket base plate has a hardness lower than that of the at least one shim.

4. A metal gasket as claimed in claim 1, wherein the bead has a wave shape located in a predetermined area around the opening.

5. A metal gasket as claimed in claim 1, wherein said first and second shims have same sizes and disposed on and under the beads to cover the entire beads.

6. A metal gasket as claimed in claim 5, wherein said first and second shims are connected simultaneously to the gasket base plate by laser welding.

7. A metal gasket as claimed in claim 6, wherein said plurality of beads is formed concentrically.

8. A metal gasket as claimed in claim 7, wherein said first and second flat shims are welded entirely around the outer peripheral portions.

9. A metal gasket as claimed in claim 1, wherein said gasket base plate includes a plurality of openings, and said first and second shims include a plurality of shim sections disposed around the plurality of openings and connected together as one unit.

* * * * *